(12) United States Patent
Nagata (10) Patent No.: US 7,151,954 B2
(45) Date of Patent: Dec. 19, 2006

(54) CELLULAR PHONE SET AND INCOMING CALL NOTIFICATION CONTROL METHOD USED THEREIN

(75) Inventor: Daigo Nagata, Saitama (JP)

(73) Assignee: NEC Corporation, Tokyo (JP)

( * ) Notice: Subject to any disclaimer, the term of this patent is extended or adjusted under 35 U.S.C. 154(b) by 569 days.

(21) Appl. No.: 10/348,988

(22) Filed: Jan. 23, 2003

(65) Prior Publication Data

US 2003/0153366 A1 Aug. 14, 2003

(30) Foreign Application Priority Data

Jan. 30, 2002 (JP) .............................. 2002-021741

(51) Int. Cl.
*H04B 1/38* (2006.01)
*H04M 1/00* (2006.01)

(52) U.S. Cl. ...................... 455/567; 455/456; 455/421; 455/418

(58) Field of Classification Search ................ 455/567, 455/456, 421, 418
See application file for complete search history.

(56) References Cited

U.S. PATENT DOCUMENTS 5,729,589 A * 3/1998 Samson .................... 379/32.04
6,018,655 A * 1/2000 Bartle et al. ................. 455/421
6,127,936 A 10/2000 Gendel et al.
6,816,731 B1 * 11/2004 Maruyama ................... 455/441
6,928,306 B1 * 8/2005 Matsuda et al. ............ 455/567
6,934,547 B1 * 8/2005 Suzuki ....................... 455/441

FOREIGN PATENT DOCUMENTS

| GB | 2379138 A | 2/2003 |
|---|---|---|
| JP | 8-307341 A | 11/1996 |
| JP | 9116968 A | 2/1997 |
| JP | 10-173586 A | 6/1998 |
| JP | 11-18157 A | 1/1999 |
| JP | 11341120 A | 10/1999 |

* cited by examiner

*Primary Examiner*—Quochien B. Vuong
*Assistant Examiner*—Richard Chan
(74) *Attorney, Agent, or Firm*—Sughrue Mion, PLLC

(57) ABSTRACT

This invention is associated with an incoming call notification technique in a cellular phone set. In the cellular phone set of this invention, when a radio wave directed to the cellular phone set is received, the reception electric field strength level of the radio wave and/or the residual amount level of a supply battery is detected, and incoming call notification is visually and/or tactually performed in accordance with this detection result. When incoming call notification is to be done by using ringing tones, different ringing tones are set in accordance with the reception electric field strength levels of radio waves and/or the residual amount levels of the supply battery.

17 Claims, 4 Drawing Sheets

| RECEPTION SIGNAL R | SETTING OF RINGING TONE |
|---|---|
| LEVEL 3 | RINGING TONE A |
| LEVEL 2 | RINGING TONE B |
| LEVEL 1 | RINGING TONE C |
| LEVEL 0 | — |

| BATTERY RESIDUAL AMOUNT LEVEL E | SETTING OF RINGING TONE |
|---|---|
| LEVEL 3 | RINGING TONE A |
| LEVEL 2 | RINGING TONE B |
| LEVEL 1 | RINGING TONE C |
| LEVEL 0 | — |

| RECEPTION SIGNAL R | BATTERY RESIDUAL AMOUNT LEVEL E | SETTING INCOMING CALL MOTION |
|---|---|---|
| LEVEL 3 | LEVEL 3 | INCOMING CALL MOTION A |
| LEVEL 2 | LEVEL 2 | INCOMING CALL MOTION B |
| LEVEL 1 | LEVEL 1 | INCOMING CALL MOTION C |
| LEVEL 0 | LEVEL 0 | — |

CELLULAR PHONE SET AND INCOMING CALL NOTIFICATION CONTROL METHOD USED THEREIN

BACKGROUND OF THE INVENTION

1. Field of the Invention

The present invention relates to a cellular phone set, and an incoming call notification method and incoming call notification control program used in the cellular phone set and, more particularly, to a cellular phone set suitably used in a place where the reception electric field strength of radio waves emitted from a radio base station is unstable, and an incoming call notification method and incoming call notification control program used in the cellular phone set.

2. Description of the Related Art

Upon reception of the radio wave emitted from a radio base station, a cellular phone set notifies the user of the incoming call by, for example, sounding a ringing tone or blinking an LED (Light-Emitting Diode) for incoming call notification. These incoming call notification means have been exclusively used to notify users of incoming calls but for no other purpose. Some cellular phone set is designed to have a function of setting different ringing tones for different callers so as to allow the user to identify a caller without seeing the display section. This function is aimed at saving the user from visually checking a caller. However, when the operation state of the cellular phone set has deteriorated (e.g., the battery voltage or reception electric field strength level has decreased), this function does not work to improve the deteriorated state.

As a cellular phone set that can solve this problem, for example, the cellular phone set disclosed in Japanese Unexamined Patent Publication No. 11-341120 (disclosed as "Mobile Radio Terminal") has been proposed. According to the cellular phone set disclosed in this reference, information indicating a decrease in battery voltage or reception electric field strength is indicated by light emission from an LED. In addition, the battery residual amount is checked when the power is turned on or by user's operation. Furthermore, the reception electric field strength is indicated by light emission from the LED in accordance with user's operation or at intermittent intervals.

The following problems, however, arise in the cellular phone set disclosed in the above reference.

Information indicating a decrease in battery voltage or reception electric field strength is assumed to be indicated in a dark place, and hence is indicated by light emission from the LED alone. For this reason, only a visual effect can be obtained, and no satisfactory effect can be expected in a bright place. In addition, since the battery residual amount is checked when the power is turned on or by user's operation, the battery residual amount is not notified unless the user willing to check it. The notification of the battery residual amount at power-on produces little effect because the user does not usually turn off the power. Furthermore, since the reception electric field strength is indicated by light emission from the LED at intermittent intervals, a current is consumed even when the user need not know it. When the reception electric field strength is to be checked by user's operation, no notification is done unless the user is willing to check it.

SUMMARY OF THE INVENTION

The present invention has been made in consideration of the above situation, and has as its object to provide a cellular phone set having a function of notifying a user of the operation state of the cellular phone set at the time of the reception of an incoming call, and an incoming call notification control method and incoming call notification control program used in the cellular phone set.

In order to achieve the above object, according to the first aspect of the present invention, there is provided a cellular phone set comprising incoming call notification means for, when a radio wave directed to the cellular phone set is received, detecting a reception electric field strength level of the radio wave and/or a residual amount level of a supply battery, and performing incoming call notification visually and/or tactually in accordance with a detection result.

According to the second aspect of the present invention, there is provided a cellular phone set which generates ringing tones upon reception of radio waves directed to the cellular phone set, comprising sound data setting means for setting the ringing tones to different sound data in accordance with reception electric field strength levels of the radio waves.

According to the third aspect of the present invention, the sound data setting means in the first aspect comprises a radio section which generates a reception signal corresponding to the reception electric field strength level, a storage section which stores in advance different sound data in accordance with levels of the reception signals, a control section which reads out sound data corresponding to the level of the reception signal from the storage section when the radio section generates the reception signal, and a sounding section which auditorily notifies a user of an incoming call by sounding the ringing tone on the basis of the sound data read out by the control section.

According to the fourth aspect of the present invention, there is provided a cellular phone set which generates ringing tones upon reception of radio waves directed to the cellular phone set, comprising sound data setting means for setting the ringing tones to different sound data in accordance with residual amount levels of a supply battery of the cellular phone set.

According to the fifth aspect of the present invention, the sound data setting means in the fourth aspect comprises a radio section which generates a reception signal upon reception of the radio wave, a battery used as a power supply, a storage section which stores in advance different sound data in accordance with battery residual amount levels of the battery, a control section which reads out sound data corresponding to the battery residual amount level from the storage section when the radio section generates the reception signal, and a sounding section which auditorily notifies a user of an incoming call by sounding the ringing tone on the basis of the sound data read out by the control section.

According to the sixth aspect of the present invention, there is provided an incoming call notification control method in a cellular phone set which generates ringing tones upon reception of radio waves directed to the cellular phone set, wherein the ringing tones are set to different sound data in accordance with reception electric field strength levels of the radio waves.

According to the seventh aspect of the present invention, setting the sound data in the sixth aspect includes the steps of performing reception signal generation processing of generating a reception signal corresponding to the reception electric field strength level, sound data storage processing of storing in advance different sound data in accordance with the reception signals, sound data readout processing of reading out sound data corresponding to the reception signal from the stored sound data when the reception signal is generated, and sounding processing of auditorily notifying a user of an incoming call by sounding the ringing tone on the basis of the readout sound data.

According to the eighth aspect of the present invention, there is provided an incoming call notification control method in a cellular phone set which generates ringing tones upon reception of radio waves directed to the cellular phone set, wherein the ringing tones are set to different sound data in accordance with residual amount levels of a supply battery of the cellular phone set.

According to the ninth aspect of the present invention, setting the sound data in the sixth aspect includes the steps of performing reception signal generation processing of generating a reception signal upon reception of the radio wave, sound data storage processing of storing in advance different sound data corresponding to battery residual amount levels of a battery used as a power supply, sound data readout processing of reading out sound data corresponding to the battery residual amount level from the stored sound data when the reception signal is generated, and sounding processing of auditorily notifying a user of an incoming call by sounding the ringing tone on the basis of the readout sound data.

According to the 10th aspect of the present invention, there is provided a cellular phone set which generates incoming call motions in part or all of the cellular phone set upon reception of radio waves directed to the cellular phone set, comprising motion data setting means for setting the incoming call motions to different motion data in accordance with reception electric field strength levels of the radio waves and/or battery residual amount levels.

According to the 11th aspect of the present invention, the motion data setting means in the 10th aspect comprises a radio section which generates a reception signal corresponding to the reception electric field strength level of the radio wave, a battery used as a power supply, a storage section which stores in advance different motion data in accordance with the reception signals and/or battery residual amount levels of the battery, a control section which reads out motion data corresponding to the reception signal and/or the battery residual amount level from the storage section when the reception signal is generated, and a motion generating section which tactually notifies a user of an incoming call by causing the incoming call motion in part or all of the cellular phone set on the basis of the motion data read out by the control section.

According to the 12th aspect of the present invention, there is provided an incoming call notification control method, in a cellular phone set which generates incoming call motions in part or all of the cellular phone set upon reception of radio waves directed to the cellular phone set, wherein the incoming call motions are set to different motion data in accordance with reception electric field strength levels of the radio waves and/or battery residual amount levels.

According to the 13th aspect of the present invention, setting the motion data in the 12th aspect includes the steps of performing reception signal generation processing of generating a reception signal corresponding to the reception electric field strength level of the radio wave, motion data storage processing of storing in advance different motion data in accordance with the reception signals and/or battery residual amount levels, motion data readout processing of reading out motion data corresponding to the reception signal and/or the battery residual amount level from the stored motion data when the reception signal is generated, and motion generation processing of tactually notifying a user of an incoming call by causing the incoming call motion in part or all of the cellular phone set on the basis of the readout motion data.

According to the 14th aspect of the present invention, there is provided an incoming call notification control program for causing a CPU of a cellular phone set described in the first, second, fourth, and 10th aspects to realize a function of the cellular phone set.

As is obvious from the above aspects, according to the present invention, since the cellular phone set includes the auditory incoming call notification means for, when a radio wave directed to the cellular phone set is received, detecting the reception electric field strength level of the radio wave and/or the residual amount level of the supply battery, and auditorily notifying the user of an incoming call by using different types of ringing tones on the basis of the detection result, the user can smoothly grasp the operation state of the cellular phone set.

In addition, the cellular phone set includes the tactile incoming call notification means for, when a radio wave directed to the cellular phone set is received, detecting the reception electric field strength level of the radio wave and/or the residual amount level of the supply battery, and tactually notifying the user of an incoming call by using different types of incoming call motions on the basis of the detection result, the user can smoothly grasp the operation state of the cellular phone set.

Since different types of ringing tones are set for the respective reception electric field strengths of the radio waves emitted from the radio base station, the user can instantly know, upon reception of the radio wave, the radio wave condition in the place where he/she is currently present. In particular, even if the cellular phone set is in a pocket of user's clothes or the like and the user cannot see the display section, he/she can instantly know the radio wave condition when the radio wave is received. With this function, when, for example, the user receives the radio wave in a place where the reception electric field strength is low, he/she hears a ringing tone corresponding to the reception signal at a low level. This allows the user to recognize a deterioration in radio wave condition in that place. The user can therefore extend the antenna. If the user is in a room, he/she can, for example, move to a window where the reception electric field strength is high. This makes it possible to perform speech communication in a better speech communication environment.

In addition, since the user is notified of an incoming call not only by visual incoming call notification using the display section but also by incoming call notification using the sounding section which sounds a ringing tone, incoming call notification can be so done as to appeal to the ear of the user That is, the same effect can be obtained regardless of whether the user is located in a bright place or dark place. In addition, since incoming call notification is performed when the radio wave is received, the user can check the reception electric field strength at the time he/she mostly wants to know the reception electric field strength without any intentional, special operation. With this function, if the reception electric field strength is low, the user can, for example, move to a place where the radio wave condition is better.

In addition, since different types of ringing tones are set for the respective battery residual amount levels, the user can instantly know, upon reception of the radio wave, the current battery residual amount. With this function, if, for example, the battery residual amount is small, the user can recognize it when he/she hears a ringing tone. This prompts the user to make his/her speech short or prepare a charger.

In addition, since incoming call notification is performed when the radio wave emitted from the radio base station is received, the user can check the battery residual mount at the time he/she is most anxious about battery consumption without any intentional, special operation.

In addition, since the user is notified of an incoming call not only by visual incoming call notification using the display section but also by incoming call notification using the sounding section which sounds a ringing tone, incoming call notification can be so done as to appeal to the ear of the user. That is, the same effect as described above can be obtained regardless of whether the user is located in a bright place or dark place.

The cellular phone set according to the present invention can appeal to the tactile sense of the user through a medium such as vibration. Therefore, the same effects as described above can be obtained in a place where no ringing tone can be sounded as in an office, a vehicle, or the like.

The above and many other objects, features and advantages of the present invention will become manifest to those skilled in the art upon making reference to the following detailed description and accompanying drawings in which preferred embodiments incorporating the principle of the invention are shown by way of illustrative examples.

DETAILED DESCRIPTION OF THE PREFERRED EMBODIMENTS

Several preferred embodiments of the present invention will be described below with reference to the accompanying drawings.

Figure 1:
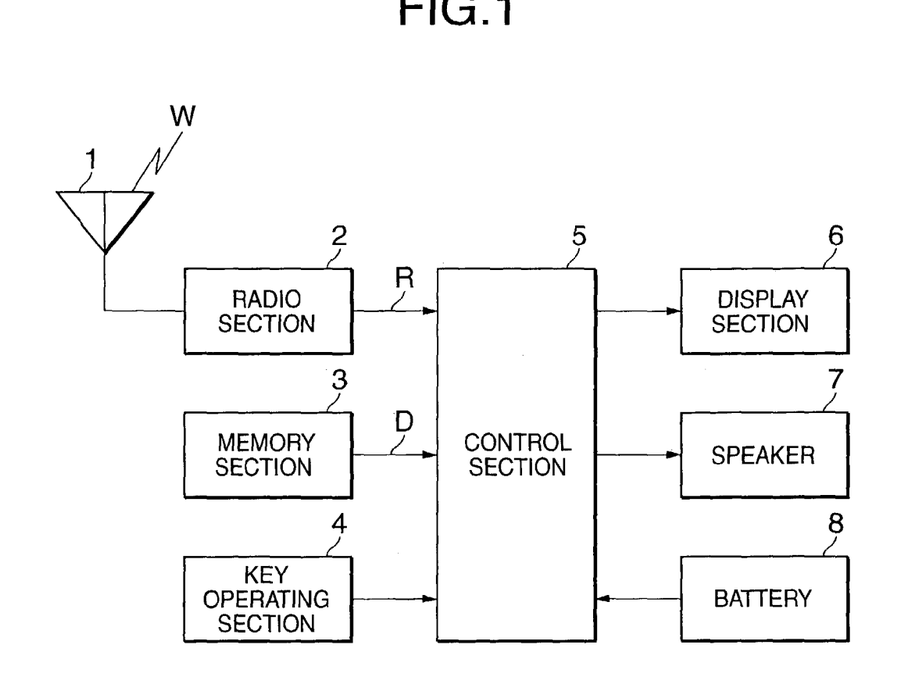
FIG. 1 is a block diagram showing the electrical arrangement of a cellular phone set according to the first embodiment of the present invention.

First Embodiment:

A cellular phone set according to the first embodiment shown in FIG. 1 is comprised of an antenna 1, radio section 2, memory section 3, key operating section 4, control section 5, display section 6, speaker 7, and battery 8.

The antenna 1 receives a radio wave W emitted from a radio base station (not shown). The radio section 2 performs transmission/reception processing of radio data through the antenna 1. Upon reception of the radio wave W through the antenna 1, the radio section 2 generates a reception signal R corresponding to the reception electric field strength of the radio wave W. The reception signal R is a signal having a voltage level dependent on the reception electric field strength of the radio wave W, i.e., whether the radio wave condition is good or bad.

The memory section 3 is constituted by a RAM (Random Access Memory) capable of arbitrary write/read operation, a ROM (Read Only Memory), and the like, and stores various programs for operating the cellular phone set, the ID information of the user, and information unique to the cellular phone set, e.g., the telephone number. The memory section 3 also stores information about a plurality of types of incoming call notification methods, data such as melodies and images downloaded by the user. Different types of sound data D corresponding to the reception signals R are also stored in the memory section 3 in advance.

The key operating section 4 is a means for performing various kinds of operations, e.g., inputting characters and the like and selecting items, in accordance with user's operation. The key operating section 4 is used to select an incoming call notification method. In this case, the first choice is an incoming call notification method which also notifies the user of the current state of the cellular phone set by using different types of ringing tones that sound in accordance with a plurality of reception electric field strength levels. When the user selects this notification method, he/she selects ringing tones, from the plurality of types of ringing tones recorded on the memory section 3, which he/she wants to set for the respective reception electric field strength levels. The second choice is the same incoming call notification method as that used in the prior art which is independent of any parameters such as reception electric field strength. This incoming call notification is used to only notify the user of an incoming call.

The control section 5 is constituted by a CPU (Central Processing Unit) for controlling the overall cellular phone set, and the like. When the reception signal R is generated by the radio section 2, the control section 5 A/D-converts (analog/digital-converts) the reception signal R and reads out the sound data D corresponding to the reception signal R from the memory section 3. In addition, the control section 5 always monitors the reception electric field strength on the basis of the reception signal R and performs display control of the reception electric field strength with respect to the display section 6. The control section 5 also causes the speaker 7 to sound a ringing tone based on the sound data D read out from the memory section 3.

The display section 6 is constituted by, for example, a liquid crystal display device and the like and designed to display the reception electric field strength and various information such as the residual amount level of the battery 8 and date.

The speaker 7 auditorily notifies the user of an incoming call by sounding a ringing tone on the basis of the sound data D read out by the control section 5.

The battery 8 is used as the main power supply of this cellular phone set.

Figure 2:
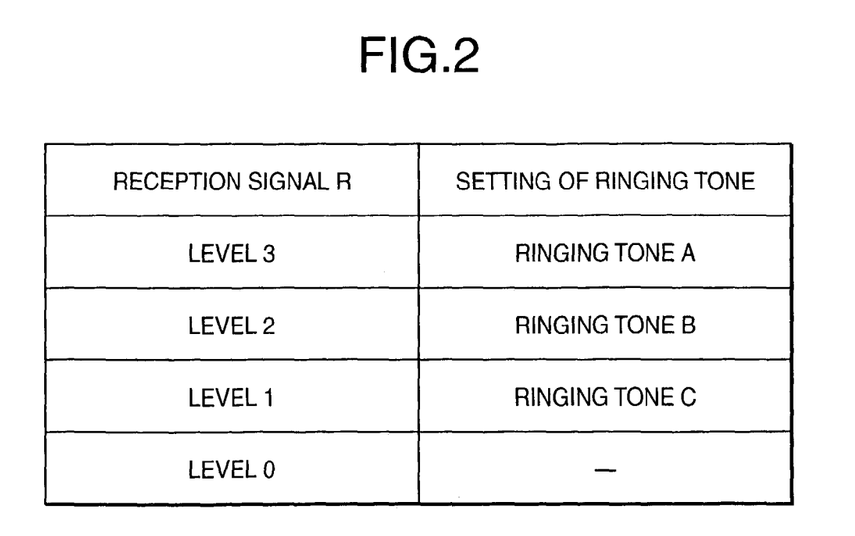
FIG. 2 is a view showing an example of the ringing tones stored in a memory section 3 in FIG. 1 on the basis of sound data D corresponding to reception signals R.

FIG. 2 is a view showing an example of different ringing tones based on the various sound data D corresponding to the reception signals R which are stored in the memory section 3 in FIG. 1.

Referring to FIG. 2, the reception signals R are set at four levels, i.e., "level 3", "level 2", "level 1", and "level 0", in order of better radio wave condition (in decreasing order of the reception electric field strength of radio waves). Note, however, that "level 0" indicates that the cellular phone set is in a dead zone, i.e., in a state wherein it cannot perform either wait operation or speech communication. The ringing tones for the respective reception electric field strengths are set such that "ringing tone A" is set for "level 3"; "ringing tone B", for "level 2"; and "ringing tone C", for "level 1". The ringing tones A, B, and C are different types of sounds. No specific ringing tone is set for "level 0" because it indicates that the cellular phone set is in a dead zone and cannot receive any incoming call.

Figure 3:
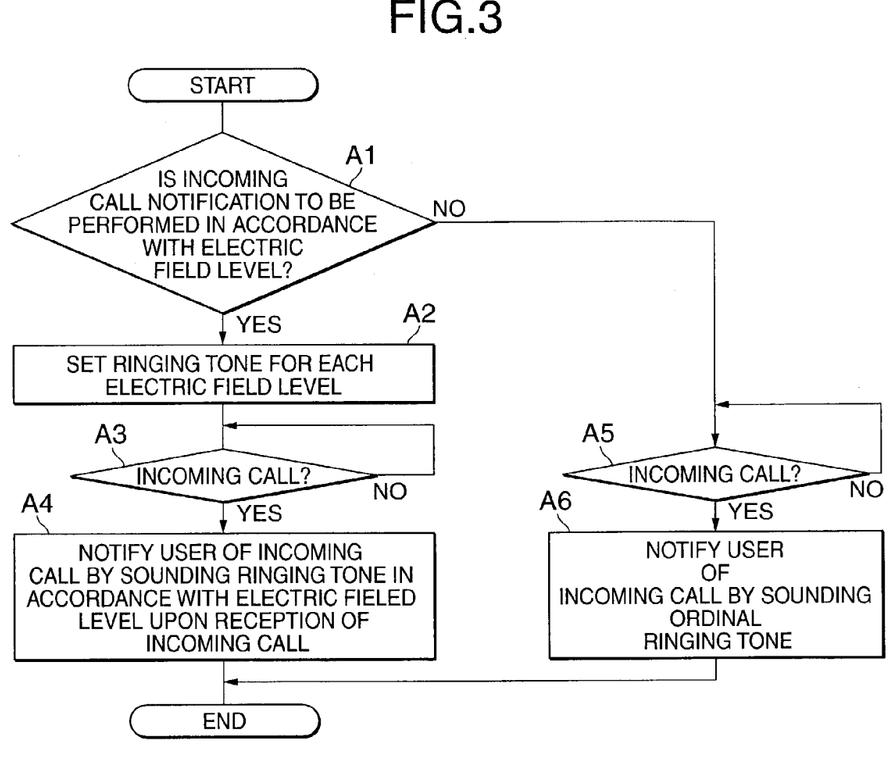
FIG. 3 is a flow chart for explaining the operation of the cellular phone set in FIG. 1.

FIG. 3 is a flow chart for explaining the operation of the cellular phone set shown in FIG. 1. The contents of processing in the incoming call notification control method used in this cellular phone set will be described with reference to FIG. 3.

First of all, the user of the cellular phone set operates the key operating section 4 to select either an incoming call notification method dependent on each reception electric field strength or an ordinary incoming call notification method independent of reception electric field strength (step A1).

If the user selects the incoming call notification method dependent on each reception electric field strength in step A1, he/she sets the types of ringing tones corresponding to "level 3" to "level 1" (step A2). In this case, the different types of sound data D corresponding to the reception signals R are stored in the memory section 3 (sound data storage processing).

If the radio wave W emitted from the radio base station is received after the types of ringing tones are completely set in step A2 (step A3), the radio section 2 generates the reception signal R corresponding to the reception electric field strength of the radio wave W (reception signal generation processing).

When the reception signal R is generated, the sound data D, of the respective sound data D stored in the memory section 3, which corresponds to the reception signal R is read out by the control section 5 (sound data readout processing). In this case, if the reception signal R is at level 3, the ringing tone A is read out as the sound data D. If the reception signal R is at level 2, the ringing tone B is read out as the sound data D. If the reception signal R is at level 1, the ringing tone C is read out as the sound data D.

The control section 5 causes the speaker 7 to sound the ringing tone based on the readout sound data D, thereby auditorily notifying the user of the incoming call (step A4; ringing tone processing).

With these processes, the user knows the state of the reception electric field strength at the time of the reception of the incoming call without seeing display on the display section 6.

Assume that the user selects the ordinary incoming call notification method in step A1. In this case, if the radio wave W is received (step A5), the control section 5 sounds an ordinary ringing tone independent of the reception electric field strength to notify the user of the incoming call (step A6).

As described above, in the first embodiment, since different types of ringing tones are set for the respective reception electric field strengths of the radio waves W, the user can instantly know, upon reception of the radio wave W, the radio wave condition in the place where he/she is currently present. In particular, even if the cellular phone set is in a pocket of user's clothes or the like and the user cannot see the display section, he/she can instantly know the radio wave condition when the radio wave W is received. With this function, when, for example, the user receives the radio wave W in a place where the reception electric field strength is low, he/she hears a ringing tone corresponding to the reception signal R at a low level. This allows the user to recognize a deterioration in radio wave condition in that place. The user can therefore extend the antenna 1. If the user is in a room, he/she can, for example, move to a window where the reception electric field strength is high. This makes it possible to perform speech communication in a better speech communication environment. In addition, since the user is notified of an incoming call not only by visual incoming call notification using the display section 6 but also by incoming call notification using the speaker 7 which sounds a ringing tone, incoming call notification can be so done as to appeal to the ear of the user. That is, the same effect can be obtained regardless of whether the user is located in a bright place or dark place. In addition, since incoming call notification is performed when the radio wave W is received, the user can check the reception electric field strength at the time he/she mostly wants to know the reception electric field strength without any intentional, special operation. With this function, if the reception electric field strength is low, the user can, for example, move to a place where the radio wave condition is better.

Second Embodiment

The same reference numerals as in FIG. 1 showing the first embodiment denote the same parts of a cellular phone set according to the second embodiment of the present invention.

Figure 4:
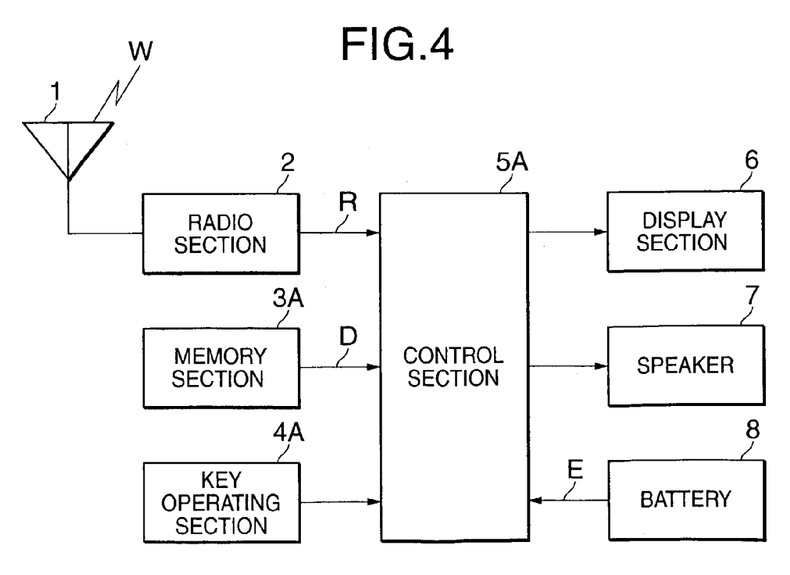
FIG. 4 is a block diagram showing the electrical arrangement of a cellular phone set according to the second embodiment of the present invention.

As is obvious from a comparison with FIG. 1, the memory section 3, key operating section 4, and control section 5 in FIG. 1 are replaced with a memory section 3A, key operating section 4A, and control section 5A each having an arrangement different from that of the corresponding section.

The memory section 3A is constituted by a RAM capable of arbitrary write/read operation, a ROM, and the like, and stores various programs for operating the cellular phone set, the ID information of the user, and information unique to the cellular phone set, e.g., the telephone number. The memory section 3 also stores information about a plurality of types of incoming call notification methods, data such as melodies and images downloaded by the user. Different types of sound data D corresponding to residual amount levels E of a battery 8 are also stored in the memory section 3A in advance.

The key operating section 4A is a means for performing various kinds of operations, e.g., inputting characters and the like and selecting items, in accordance with user's operation. The key operating section 4A is used to select an incoming call notification method. In this case, the first choice is an incoming call notification method which also notifies the user of the current state of the cellular phone set by using different types of ringing tones that sound in accordance with the respective battery residual amount levels E of the battery 8. When the user selects this notification method, he/she selects ringing tones, from the plurality of types of ringing tones recorded on the memory section 3A, which he/she wants to set for the respective residual amount levels E. The second choice is the same incoming call notification method as that used in the prior art which is independent of any parameters such as the residual amount levels E. This incoming call notification is used to only notify the user of an incoming call.

The control section 5A is constituted by a CPU for controlling the overall cellular phone set, and the like. When a reception signal R is generated by a radio section 2, the control section 5A A/D-converts the residual amount level E and reads out the sound data D corresponding to the battery residual amount level E from the memory section 3A. In addition, the control section 5A always monitors the residual amount of the battery 8 on the basis of the battery residual amount level E and performs control concerning battery residual amount display on a display section 6. The control section 5A also causes a speaker 7 to sound a ringing tone based on the sound data D read out from the memory section 3A. Since the residual arrangement is the same as that shown in FIG. 1, a detailed description thereof will be omitted.

Figure 5:
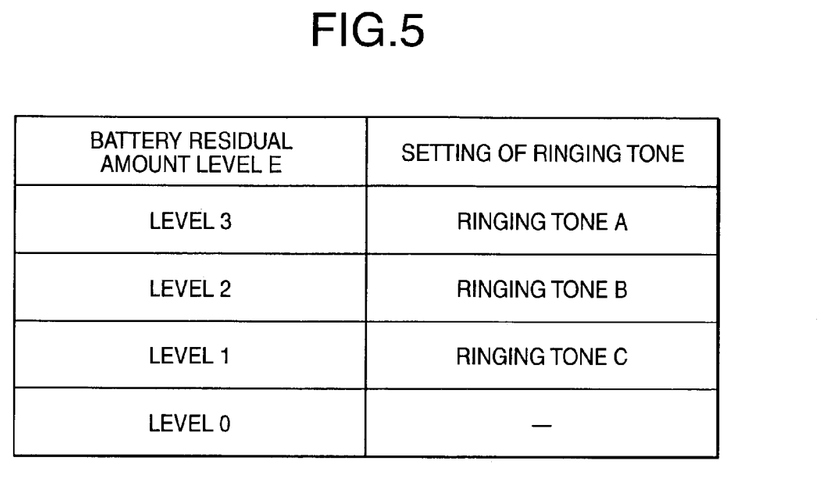
FIG. 5 is a view showing an example of the ringing tones stored in a memory section 3A in FIG. 4 on the basis of sound data D corresponding to battery residual amount levels E.

FIG. 5 is a view showing an example of the ringing tones stored in the memory section 3A in FIG. 4 on the basis of sound data D corresponding to residual amount levels E of the battery 8.

Referring to FIG. 5, the residual amount levels E of the battery 8 are set at four levels, i.e., "level 3", "level 2", "level 1", and "level 0", in decreasing order of battery residual amount. Note, however, that "level 0" indicates that the power is OFF, i.e., the voltage level at which the cellular phone set cannot operate. The ringing tones for the respective residual amount levels E are set such that "ringing tone A" is set for "level 3"; "ringing tone B", for "level 2"; and "ringing tone C", for "level 1". The ringing tones A, B, and C are different types of sounds. No specific ringing tone is set for "level 0" because it indicates that the power is OFF and no radio wave W is received from the radio base station.

Figure 6:
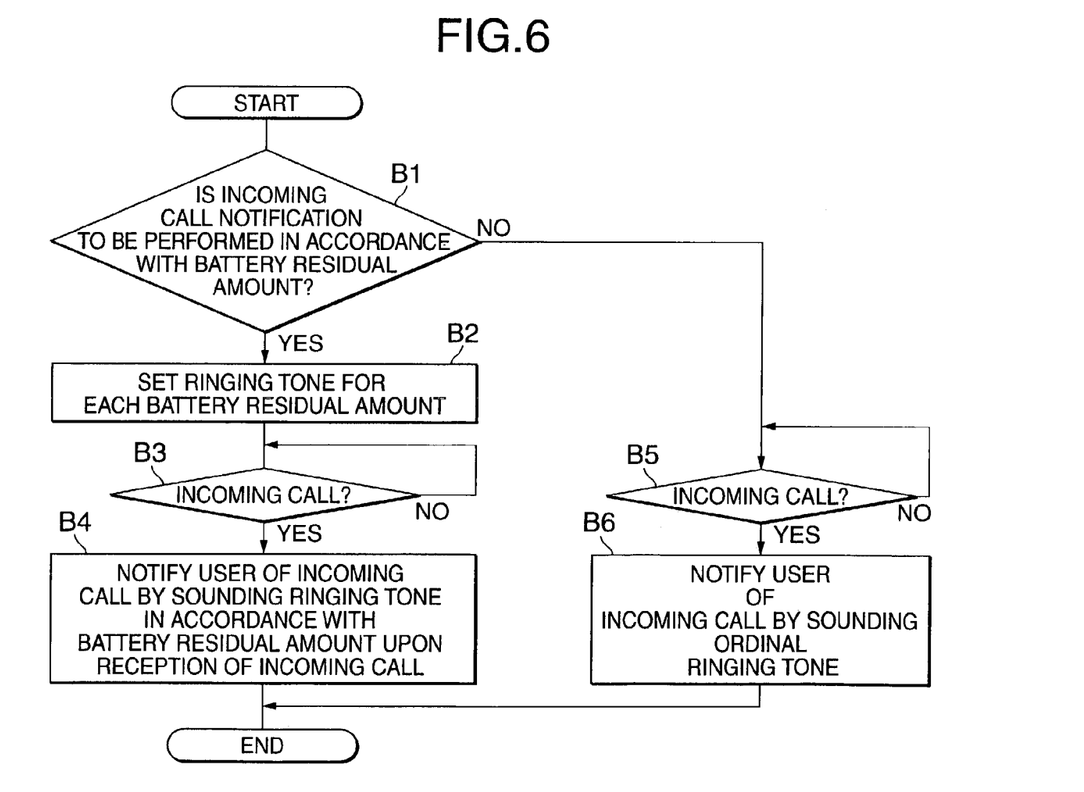
FIG. 6 is a flow chart for explaining the operation of the cellular phone set shown in FIG. 4.

FIG. 6 is a flow chart for explaining the operation of the cellular phone set shown in FIG. 4.

The contents of processing in an incoming call notification control method used in the cellular phone set according to the second embodiment will be described with reference to FIG. 6.

First of all, the user of the cellular phone set operates the key operating section 4A to select either an incoming call notification method dependent on the residual amount level E or an ordinary incoming call notification method independent of the battery residual amount level E (step B1).

If the user selects the incoming call notification method dependent on the battery residual amount level E in step B1, he/she sets the types of ringing tones corresponding to "level 3" to "level 1" (step B2). In this case, the different types of sound data D corresponding to the respective residual amount levels E are stored in the memory section 3A in advance (sound data storage processing).

If the radio wave W emitted from the radio base station is received after the types of ringing tones are completely set in step B2 (step B3), the radio section 2 generates a reception signal R corresponding to the reception electric field strength of the radio wave W (reception signal generation processing). When the reception signal R is generated, the sound data D, of the respective sound data D stored in the memory section 3A, which corresponds to the battery residual amount level E is read out by the control section 5A (sound data readout processing). In this case, if the battery residual amount level E is at level 3, the ringing tone A is read out as the sound data D. If the battery residual amount level E is at level 2, the ringing tone B is read out as the sound data D. If the battery residual amount level E is at level 1, the ringing tone C is read out as the sound data D.

The control section 5A causes the speaker 7 to sound the ringing tone based on the readout sound data D, thereby auditorily notifying the user of the incoming call (step B4; ringing tone processing). With these processes, the user knows the state of the residual amount level E of the battery 8 at the time of the reception of the incoming call without seeing display on the display section 6.

Assume that the user selects the ordinary incoming call notification method in step B1. In this case, if the radio wave W is received (step B5), the control section 5A sounds an ordinary ringing tone independent of the battery residual amount level E to notify the user of the incoming call (step B6).

As described above, in the second embodiment, since different types of ringing tones are set for the respective battery residual amount levels E, the user can instantly know, upon reception of the radio wave W, the current battery residual amount. With this function, if, for example, the battery residual amount is small, the user can recognize it when he/she hears a ringing tone. This prompts the user to make his/her speech short or prepare a charger. In addition, since incoming call notification is performed when the radio wave W is received, the user can check the battery residual mount at the time he/she is most anxious about battery consumption without any intentional, special operation. In addition, since the user is notified of an incoming call not only by visual incoming call notification using the display section 6 but also by incoming call notification using the speaker 7 which sounds a ringing tone, incoming call notification can be so done as to appeal to the ear of the user. That is, the same effect can be obtained regardless of whether the user is located in a bright place or dark place.

Third Embodiment

A case wherein incoming call notification is performed by using a tactile notification means will be described next as the third embodiment of the present invention with reference to FIGS. 7 and 8.

Figure 7:
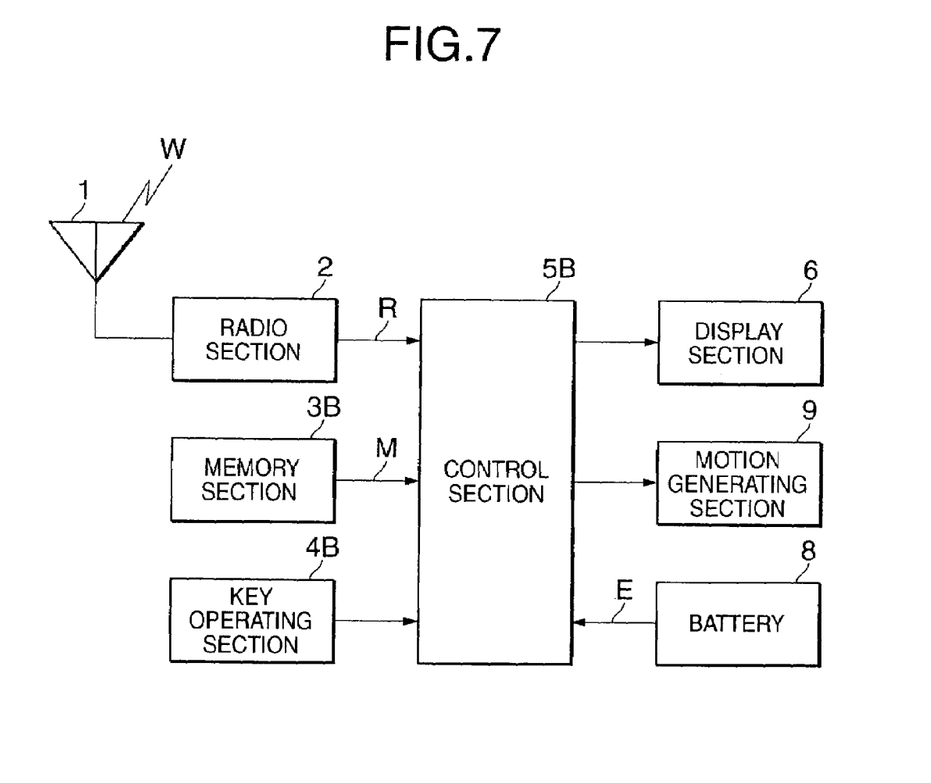
FIG. 7 is a block diagram showing the electrical arrangement of a cellular phone set according to the third embodiment of the present invention.

The same reference numerals as in FIG. 4 showing the second embodiment denote the same parts of a cellular phone set according to the third embodiment shown in FIG. 7, and these parts have the same functions. A description of them will therefore be omitted.

As is obvious from a comparison with FIG. 1, the memory section 3A, key operating section 4A, and control section 5A in FIG. 4 are replaced with a memory section 3B, key operating section 4B, and control section 5B. This cellular phone set also includes a motion generating section 9 for causing an incoming call motion such as vibrations in part or all of the cellular phone set.

The memory section 3B stores in advance different motion data M corresponding to reception signals R and/or battery residual amount levels E.

The key operating section 4B is used to select an incoming call notification method. In this case, the first choice is an incoming call notification method which also notifies the user of the current state of the cellular phone set by using different types of ringing tones that sound in accordance with the respective reception signals R and/or the respective battery residual amount levels E. When the user selects this notification method, he/she selects ringing tones, from the plurality of types of ringing tones recorded on the memory section 3B, which he/she wants to set for the respective reception signals R and/or the respective battery residual amount levels E. The second choice is the same incoming call notification method as that used in the prior art which is independent of any parameters such as the reception signals R and/or the battery residual amount levels E. This incoming call notification is used to only notify the user of an incoming call.

When the reception signal R is generated by a radio section 2, the control section 5B reads out the motion data M, of the respective motion data stored in the memory section 3B, which corresponds to the reception signal R and/or the battery residual amount level E. At this time, the motion data M corresponding to a low level of the reception signals R and/or the residual amount levels E. The control section 5B also causes, in part or all of the cellular phone set, the incoming call motion based on the motion data M read out from the memory section 3B.

Figure 8:
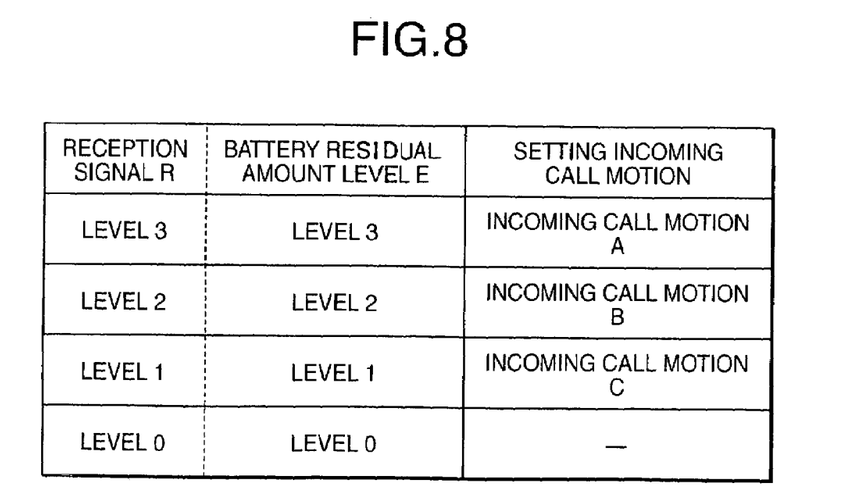
FIG. 8 is a view showing an example of the incoming call motions stored in the memory section 3B in FIG. 7 on the basis of motion data D corresponding to reception signals R and/or residual amount levels E of a battery 8.

FIG. 8 is a view showing an example of incoming call motions based on the respective motion data M corresponding to the reception signals R and/or the battery residual amount levels E which are stored in the memory section 3B in FIG. 7.

Referring to FIG. 8, the reception signals R and/or the battery residual amount levels E are set at four levels, i.e., "level 3", "level 2", "level 1", and "level 0", in decreasing order. The ringing tones for the respective reception signals R and/or the battery residual amount levels E are set such that "ringing tone A" is set for "level 3"; "ringing tone B", for "level 2"; and "ringing tone C", for "level 1". The ringing tones A, B, and C are different types of sounds. No specific ringing tone is set for "level 0" because it indicates that the power is OFF and no radio wave W is received from the radio base station.

The cellular phone set according to the third embodiment can appeal to the tactile sense of the user through a medium such as vibration, and can be effectively used in a place where no ringing tone can be sounded as in an office, a vehicle, or the like. In addition, this cellular phone set can obtain a combination of the effects of the first and second embodiments.

The embodiments of the present invention have been described in detail above with reference to the accompanying drawings. Obviously, however, the practical arrangement is not limited to the embodiments described above, and any modifications and changes in design within the spirit and scope of the present invention are incorporated in the present invention.

For example, in the first and third embodiments, the reception signals R are set at four levels. However, they may be set at an arbitrary number of levels. In the second and third embodiments, the battery residual amount levels E are set to four levels. However, they may be set to an arbitrary number of levels. In the first and second embodiments, the ringing tones A, B, and C are set to different types. However, they may be set to different tunes, melodies, or frequencies.

What is claimed is:

1. A cellular phone set which generates ringing tones upon reception of radio waves directed to said cellular phone set, comprising:
    detecting means for detecting a plurality of reception electric field strength levels of the radio waves that are received;
    storage means for storing a plurality of ringing patterns which respectively correspond to the plurality of reception electric field strength levels that are detected, wherein each ringing pattern corresponds to a different one of the plurality of reception electric field strength levels;
    sound data setting means for selecting one of the plurality of different ringing patterns that corresponds to a reception electric field strength level that is detected by the detecting means; and
    incoming call notification means for indicating an incoming telephone call by reproducing the ringing pattern that is selected by the sound data setting means,
    wherein the sound data setting means sets the plurality of ringing patterns in accordance with a user selection of each ringing pattern to each reception electric field strength level.

2. A cellular phone set according to claim 1, wherein the sound data setting means comprises a control section which reads out the selected ringing pattern that corresponds to the reception electric field strength level that is detected to the level of the reception signal from said storage section when said radio section generates the reception signal, and
    the incoming call notification means comprises a sounding section which auditorily notifies the user of the incoming call by sounding the selected ringing pattern.

3. An incoming call notification control method in a cellular phone set for generating ringing tones upon reception of radio waves directed to said cellular phone, the method comprising:
    detecting a plurality of reception electric field strength levels of radio waves that are received;
    storing a plurality of ringing patterns which respectively correspond to the plurality of reception electric field strength levels that are detected, wherein each ringing pattern corresponds to a different one of the plurality of reception electric field strength levels;
    selecting one of the plurality of different ringing patterns that corresponds to a reception electric field strength level that is detected;
    indicating an incoming telephone call by reproducing the ringing pattern that is selected; and
    setting the plurality of ringing patterns in accordance with a user selection of each ringing pattern to a corresponding reception electric field strength level.

4. A method according to claim 3, wherein setting the sound data comprises
    sound data readout processing of reading out the selected ringing pattern that corresponds to the reception electric field strength level that is detected, and
    wherein indicating an incoming telephone call comprises auditorily notifying the user of the incoming call by sounding the selected ringing pattern.

5. An incoming call notification control program for causing a CPU of a cellular phone set of claim 1 to realize a function of the cellular phone set.

6. A cellular phone set according to claim 1, wherein the plurality of reception electric field strength levels are detected as voltage levels that are dependent on the electric field strength levels that are received.

7. A cellular phone set according to claim 1, wherein the plurality of ringing patterns include at least one of different tunes, melodies, and frequencies.

8. A cellular phone set according to claim 1, wherein the incoming call notification means displays a visual notification of the reception electric field strength level that is detected in addition to reproducing the selected ringing pattern.

9. A cellular phone set according to claim 1, wherein the user selects a different ringing pattern for each of the plurality of reception electric field strength levels from the plurality of ringing patterns that are stored.

10. A cellular phone set according to claim 2, wherein the sounding section auditorily notifies the user by reproducing the selected ringing pattern when the incoming call is received by the cellular phone set.

11. A cellular phone set according to claim 1, wherein the incoming call notification means notifies the user of the of the reception electric field strength level that is detected by reproducing a different vibration pattern, wherein each of a plurality of different vibration patterns corresponds to a different one of the plurality of reception electric field strength levels.

12. A method according to claim 3, wherein the plurality of reception electric field strength levels are detected as voltage levels that are dependent on the electric field strength levels that are received.

13. A method according to claim 3, wherein the plurality of ringing patterns include at least one of different tunes, melodies and frequencies.

14. A method according to claim 3, wherein the indicating the incoming telephone call further comprises displaying a visual notification of the reception electric field strength level that is detected.

15. A method according to claim 3, wherein in the setting the plurality of ringing patterns, the user selects a different ringing pattern for each of the plurality of reception electric field strength levels from the plurality of ringing patterns that are stored.

16. A method according to claim 4, wherein the indicating the incoming telephone call further comprises auditorily notifying the user by reproducing the selected ringing pattern when the incoming call is received by the cellular phone set.

17. A method according to claim 3, wherein the indicating the incoming telephone call further comprises notifying the user of the of the reception electric field strength level that is detected by reproducing a different vibration pattern, wherein each of a plurality of different vibration patterns corresponds to a different one of the plurality of reception electric field strength levels.

* * * * *